United States Patent [19]

Brun et al.

[11] Patent Number: 5,455,018
[45] Date of Patent: Oct. 3, 1995

[54] MAGNESIUM CHLORIDE PARTICULATES HAVING UNIQUE MORPHOLOGY AND OLEFIN POLYMERIZATION CATALYSTS SUPPORTED THEREON

[75] Inventors: Claude Brun; Jean-Michel Brusson, both of Idron; Laurent Duranel, Arthez De Bearn; Roger Spitz, Saint Symphorien D'Ozon, all of France

[73] Assignee: Elf Atochem S.A., Puteaux, France

[21] Appl. No.: 61,245

[22] Filed: May 17, 1993

[30] Foreign Application Priority Data

May 15, 1992 [FR] France .................. 92 05909

[51] Int. Cl.$^6$ ........................ C01F 5/30
[52] U.S. Cl. ............. 423/498; 423/497; 23/304; 23/301; 502/134
[58] Field of Search ........... 23/301, 304, 301 R; 423/497, 498; 502/134, 169, 172, 226

[56] References Cited

U.S. PATENT DOCUMENTS 3,989,881  11/1976  Yamaguchi et al. .............. 526/125
5,212,132  5/1993  Spitz et al. ...................... 502/134
5,212,133  5/1993  Duranel et al. .................. 502/134

FOREIGN PATENT DOCUMENTS 449673  10/1991  European Pat. Off. ..
488856   6/1992  European Pat. Off. ..
2266706 10/1975  France .

OTHER PUBLICATIONS

*Chemical Engineer's Handbook*, edited by Perry, McGraw–Hill Book Co., New York, 1950, pp. 1050–1071.
Journal Of Applied Polymer Science, vol. 40, 1990, pp. 1303–1311, K. Kang et al, "Effect Of Internal Lewis Bases On Recrystallized MgCl2–TiCl2 Catalysts For Polypropylene".
Angewandte Makromolekulare Chemie, vol. 120, 1984, pp. 73–90, P. Galli et al, "High Yield Catalysts in Olefin Polymerization".

*Primary Examiner*—Romulo H. Delmendo
*Attorney, Agent, or Firm*—Burns, Doane, Swecker & Mathis

[57] ABSTRACT

Crystalline $MgCl_2$ particulates, exhibiting the morphology of substantially regular polyhedra having an even number of from 10 to 18 face surfaces, are well suited as support substrate for olefin polymerization catalysts.

14 Claims, 7 Drawing Sheets

MAGNESIUM CHLORIDE PARTICULATES HAVING UNIQUE MORPHOLOGY AND OLEFIN POLYMERIZATION CATALYSTS SUPPORTED THEREON

BACKGROUND OF THE INVENTION

Field of the Invention

The present invention relates to preferably anhydrous magnesium chloride ($MgCl_2$) particulates having unique morphology and to a process for the production thereof.

This invention also relates to the use of such $MgCl_2$ particulates as support substrates for catalytically active phases, notably those of Ziegler-Natta type for the polymerization of olefins.

SUMMARY OF THE INVENTION

Thus, the present invention features porous particles of $MgCl_2$ which, when viewed under a microscope, are in the form of substantially regular polyhedra having an even number of from 10 to 18 faces and having a range of structures extending from the type comprising two truncated pyramids joined at their largest base to a prism having bevelled sides, each two faces symmetrically opposite to one another being substantially parallel.

As each two faces symmetrically opposite to one another are substantially parallel, said faces may indeed be regarded as geometrically substantially identical.

The greatest distance (D) opposing the two points furthest apart from one another in the particle usually ranges from 10 to 400 μm.

The greatest height (h) separating the two parallel faces of a particle which are furthest apart from one another usually ranges from 0.6 to 0.8 D. The smallest height (e) separating the two parallel faces of the same particle which are closest to one another usually ranges from 0.1 to 0.8 D. Under these conditions, the ratio (h)/(e) ranges from 1 to 8.

DETAILED DESCRIPTION OF PREFERRED EMBODIMENTS OF THE INVENTION

More particularly according to the present invention, most of the $MgCl_2$ comprises particles formed from a mixture of polyhedra having from 10 to 18 faces as described above.

It is also within the scope of this invention that some of these particles are in the form of a twinned crystal representing the combination of two or more crystals of the same species, oriented according to different axes with partial interpenetration.

The particles based on $MgCl_2$ have a low porosity. This may range from 0.1 to 1 $cm^3/g$ and preferably from 0.2 to 0.8 $cm^3/g$. Their specific surface area usually ranges from 0.5 to 10 $m^2/g$ and preferably from 1 to 3 $m^2/g$.

The average size of the $MgCl_2$ particles, determined by the Malvern technique, generally ranges from 50 to 200 μm for a narrow particle size distribution. Usually, the particle size distribution range, expressed as $D_{90}/D_{10}$, is less than 10 and more generally less than 6; $D_{90}$ is the diameter below which there are present 90% by weight of the particles and $D_{10}$ is the diameter below which there are present 10% by weight of the particles.

X-ray examination of the subject molecular compound based on $MgCl_2$ evidenced a crystalline product.

In particular, the X-ray diffraction spectrum of the compound $MgCl_2$, 1.5 THF (tetrahydrofuran) has the following principal diffraction lines:

| Position in $2^\theta$ | Relative intensity |
| --- | --- |
| 9.25 | 59.9 |
| 9.50 | 100.00 |
| 16.96 | 15.5 |
| 20.27 | 29.2 |
| 22.45 | 23.76 |
| 24.45 | 15.77 |
| 25.27 | 24.98 |
| 32.19 | 36.57 |
| 32.34 | 19.02 |
| 38.77 | 18.99 |
| 39.77 | 18.53 |

The width of the peaks at mid-height, which is a characteristic of the crystallite size, is 0.169± 0.006 for the line at 9.25 and 1.21±0.003 for the line at 9.50.

The measurements are carried out using an INEL CPS-160 apparatus, at a voltage of 40 kV and a current of 35 mA, using the Kα line of a copper anticathode and silicon calibration. The INEL spectrum is indexed by virtue of the Prolix computer program and refined according to the Pearson VII projection.

From its original structure, the $MgCl_2$ obtained presents the same advantages as a $MgCl_2$ of spherical form while attenuating its disadvantages. Particular structures of $MgCl_2$ have been sought in order to obtain good flowability, determined according to ASTM standard D1895, of the $MgCl_2$, and more particularly of the final polymer or copolymer when it is used as catalyst support. The spherical form has been considered particularly desirable in the case of catalysis in order that the final polymer or copolymer particle, substantially homothetically reproducing the support particle, should have this property of flowability. The disadvantage of such spherical morphology is that it facilitates the accumulation of electrostatic charges in the reactors and piping, promoting, in particular, the adhesion of powder to the walls thereof. The structure of the $MgCl_2$ according to the invention permits this category of disadvantage to be attenuated.

The process for the production of magnesium chloride particles having a polyhedral structure according to the invention, comprising suspending magnesium chloride in at least one complexing solvent, the molar ratio of solvent to $MgCl_2$ being less than the solubility ratio of these two compounds at the temperature of suspension, entails heating the complexing solvent to boiling temperature in a closed circuit including a reactor equipped with stirring means, a distillation column and cooling means, and recycling the vapor condensed by the cooling means to the reactor after having been enriched in $MgCl_2$ by dissolution of $MgCl_2$ placed between the cooling means and the reactor.

Figure 1:
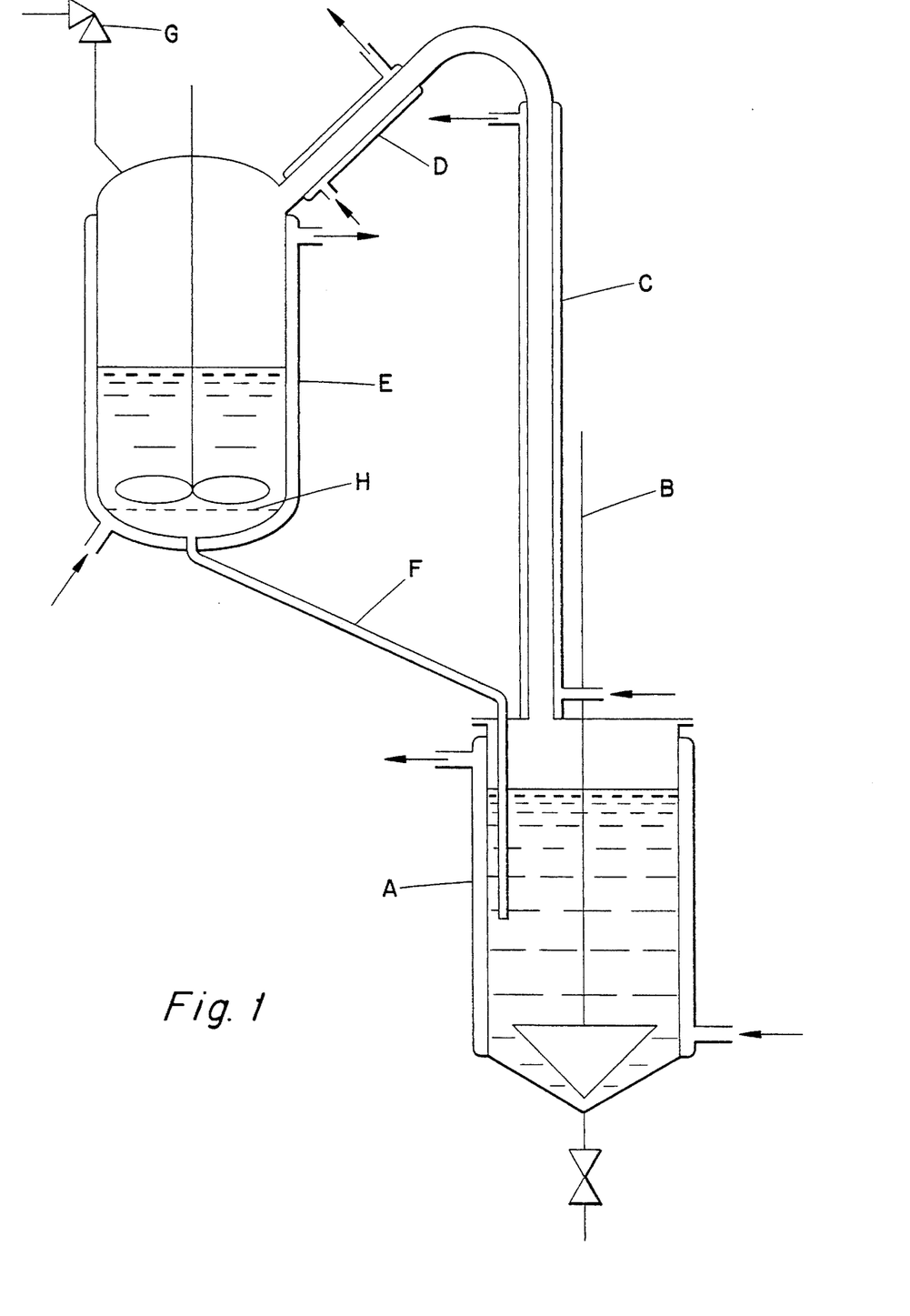
FIG. 1 illustrates an apparatus used in connection with the process according to the present invention.

Referring specifically to the Figures of Drawing, FIG. 1 illustrates an apparatus which enables the process according to the invention to be carried out. The reactor A, provided with a stirrer B, contains the complexing solvent, which is distilled, by any means of heating, in the column C and condensed by means of a condenser D. The cooled solvent, before recycling to the reactor A via the conduit F, passes through the reservoir E containing solid $MgCl_2$. On contact with the $MgCl_2$, the solvent becomes enriched in $MgCl_2$ which will be concentrated in the reactor A, will crystallize in the form of polyhedra in the supersaturated medium and will cause the crystals already formed to grow at the rate at which $MgCl_2$ is supplied to the reactor. It is advantageous that the apparatus should have a safety valve G. The $MgCl_2$ reservoir E only has to hold the solid $MgCl_2$ serving, via the dissolution thereof in the solvent, to enrich the suspension contained in the reactor A. A plurality of means are suitable. The reservoir may be, for example, a vessel having a porous base H, or a cage having a sufficiently fine mesh to permit the $MgCl_2$ solution formed to pass therethrough while retaining the $MgCl_2$ particles which have not yet dissolved, or a Kumagawa-type boat placed in the apparatus.

Figure 2:
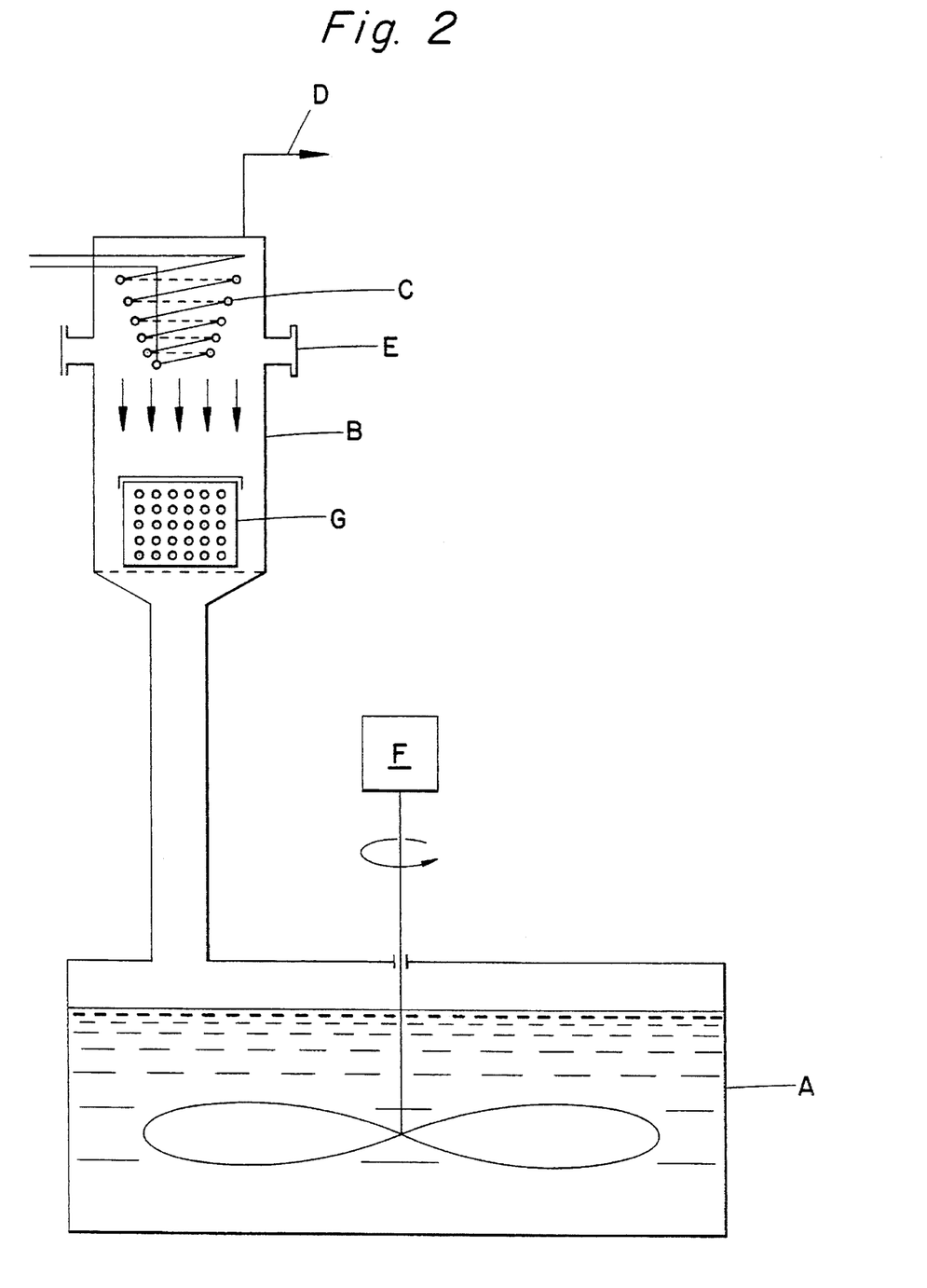
FIG. 2 illustrates an apparatus for carrying out the process of the present invention.

Another type of apparatus shown in FIG. 2 is a system for carrying out the subject process. The reactor A, which is provided with stirring means F, is in direct contact with a column B provided, at its upper end, with cooling means C. A boat G containing the $MgCl_2$ for enrichment is placed between this cooling means and the reactor. A vent D is provided and systems E permit each of the elements of the apparatus to be separated for assembly and disassembly.

Figure 3:
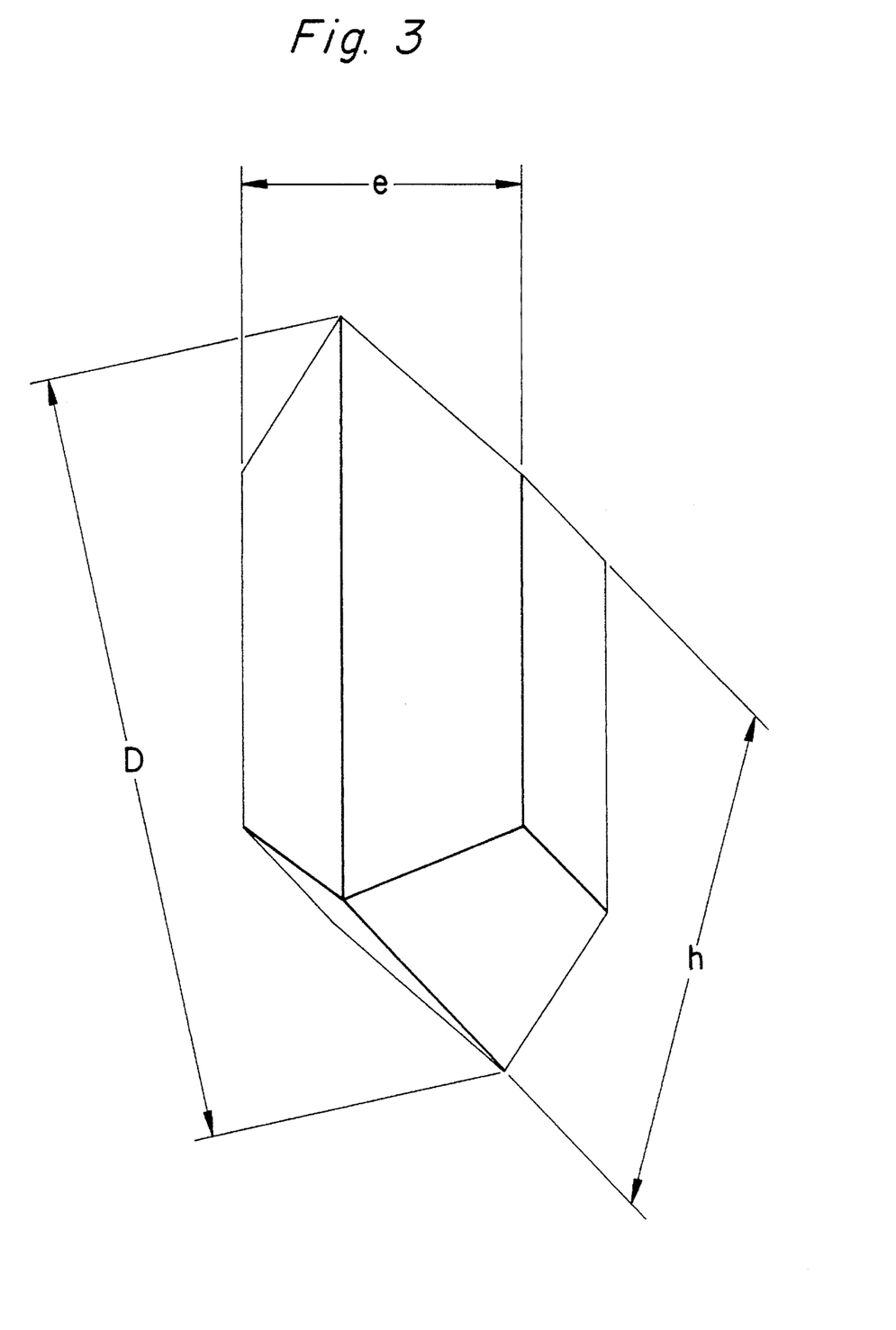
FIGS. 3 and 4 illustrate $MgCl_2$ particles in the form of polyhedra according to the present invention.
Figure 4:
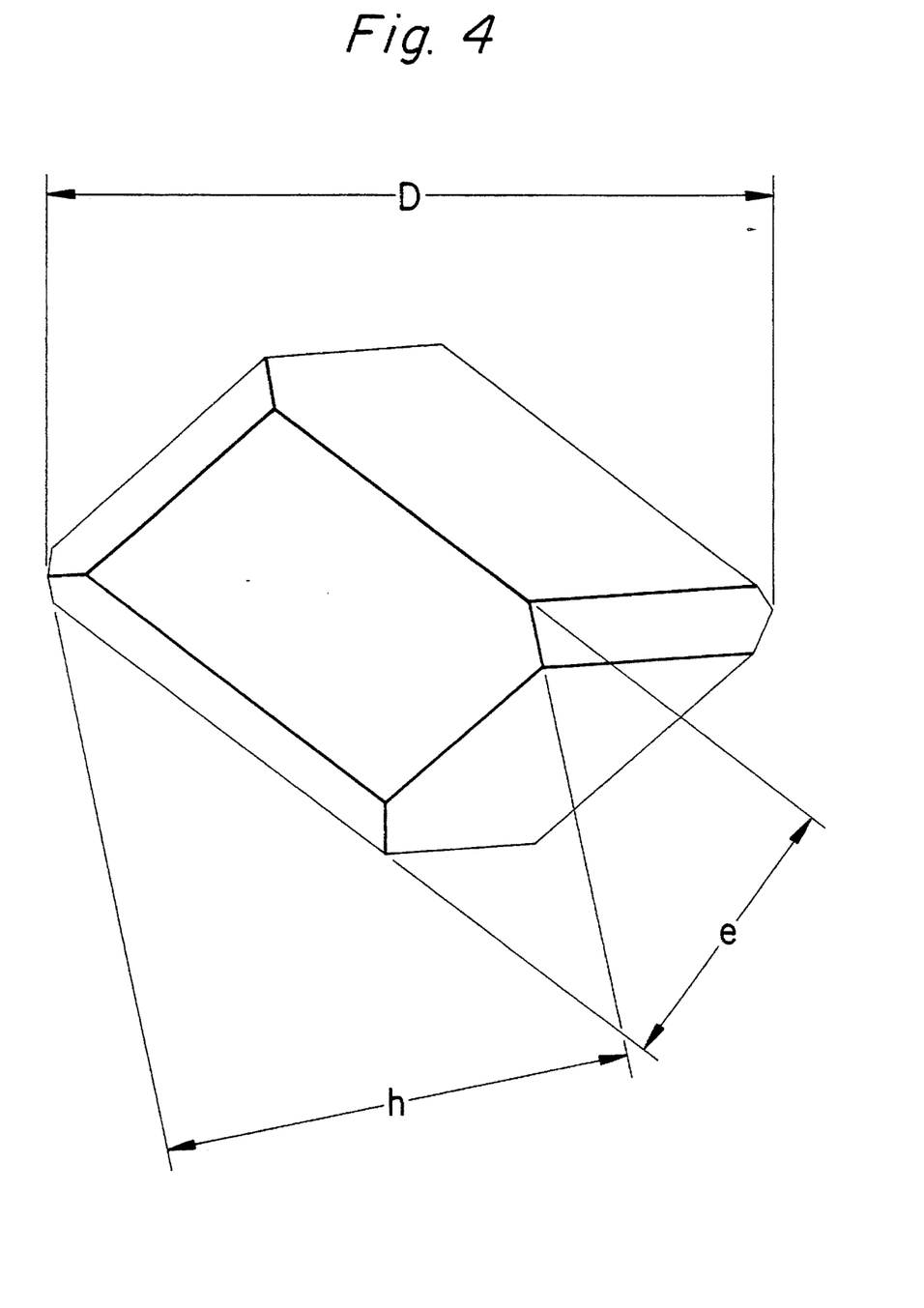

According to the process of the invention, it is possible to use the complexing solvent alone as starting material in the reactor, which solvent is regularly enriched in $MgCl_2$, as described above, until $MgCl_2$ particles appear in the reactor. By continuing the enrichment of the medium by distilling the solvent from the reactor and recycling it with a supply of $MgCl_2$, it is possible to obtain $MgCl_2$ particles in the form of polyhedra, the (D) of which may attain 400 μm and which may be illustrated in the form of polyhedra as shown diagrammatically in the FIGS. 3 and 4.

In order to accelerate handling, it is advantageous to carry out the enrichment and enlargement of the particles in the reactor by starting from a base stock of suspended $MgCl_2$ particles from a previous production. It is also possible to prepare $MgCl_2$ seeds in polyhedral form in a first step by suspending $MgCl_2$ in one of its complexing solvents, the molar ratio of solvent to $MgCl_2$ being less than the solubility ratio of these two materials at the suspension temperature. Under these conditions, some $MgCl_2$ must remain in suspension in the complexing solvent. The medium remains two-phase and contains sufficient complexing solvent to maintain some $MgCl_2$ in suspension. In a preferred embodiment, the $MgCl_2$, which is preferably anhydrous or of a commercial grade containing less than 10% of water and is of any structure, is contacted with the complexing solvent, preferably with stirring. The $MgCl_2$ is maintained in suspension for a sufficient period of time, on the order of a few hours, to permit thorough swelling of the particles by the complexing solvent. In order to obtain the best results, it is advantageous to operate, throughout the duration of the implementation of this step, essentially at a temperature of from (bp −30° C.) to (bp +40° C.), bp being the boiling point of the complexing solvent at atmospheric pressure. This treatment permits the rearrangement of the initial $MgCl_2$ particles.

The most evident phenomena which are produced during the particle size rearrangement are the disappearance of the fine particles and the disappearance of the coarse particles of initial $MgCl_2$, with the appearance of a particular shape of particles as described above, which exhibit a narrow particle size distribution.

Following this step, without changing the initial amount of solvent, distillation of the solvent is carried out in a closed circuit in the presence, in the apparatus, of enriching $MgCl_2$ as described above. This $MgCl_2$ is also preferably anhydrous or of a commercial grade containing less than 10% of water and of any structure.

When carrying out the process of the invention in two steps, it appears easier to control the uniformity of the enlargement of the particles in the second step.

In order to determine the desired final average size of the particles, the following equation can be used:

$$\text{enlargement} = \frac{\text{Final } D_{50}}{\text{Initial } D_{50}} = \left[ \frac{m_1 + m_2}{m_1} \right]^{1/3}$$

in which $D_{50}$ is the diameter below which there are present 50% by weight of the particles; the term "initial" corresponding to the particles initially in suspension when the medium is in two-phase form before enrichment; $m_1$=weight of $MgCl_2$ in the particles present in the initial supersaturated medium; and $m_2$=weight of $MgCl_2$ supplied by the distillation of the complexing solvent in order to enrich the medium and to enlarge the particles.

By "complexing solvent" is intended any chemical compound which is a Lewis base and is capable of forming with $MgCl_2$ a complex of defined stoichiometry which is stable even in the presence of an excess of said solvent and even in the pure solvent.

Among the solvents particularly suitable for the production of $MgCl_2$ particles as defined above, tetrahydrofuran is the preferred.

Once the desired final size of the particles has been attained, these particles of $MgCl_2$ in suspension are separated off from the solvent saturated with $MgCl_2$, are optionally washed, for example with a hydrocarbon, and are optionally dried by means of heat and/or treated under vacuum or via chemical technique to remove all or part of the complexing solvent.

The $MgCl_2$ recovered is in the form of the complex $MgCl_2.nX$, in which X is the solvent for the $MgCl_2$ which is complexed thereto The value of "n", representing the molar ratio $X/MgCl_2$, may obviously be zero when all of the solvent has been removed from the $MgCl_2$. Usually, this value of "n" ranges from 0 to 3. For example, in the particular case where tetrahydrofuran is used as the complexing solvent, an advantageous value of "n" is less than or equal to 2.5 and after drying the complex is less than or equal to 1.5.

This MgCl$_2$ in the form of a complex with the complexing solvent may be used as such in the case where it serves as a support substrate for a transition metal for catalyst components of the Ziegler-Natta type.

For suspending the MgCl$_2$, the term "complexing solvent" is intended to connote not only the use of a single complexing solvent, but also a mixture of a plurality of such compounds. It is possible to add to the complexing solvent a miscible compound which is inert with respect to the complexing solvent, such as a hydrocarbon having from 6 to 30 carbon atoms, which may be saturated or unsaturated, linear or cyclic hydrocarbons, such as heptane, cyclohexane, toluene, benzene or derivatives thereof, such as durene or xylene, or from compounds containing one or more heteroatoms, such as ethers, esters, amines and silanes.

It is also possible to combine the complexing solvent in the reactor with polymers or copolymers of alpha-olefins having from 2 to 8 carbon atoms, or styrene polymers or copolymers having number-average molecular weights $\overline{Mn}$ of from 1,000 to 20,000, or silicone oils which have an $\overline{Mn}$ of from 500 to 10,000 and are soluble in the complexing solvent, or vinyl resins. These compounds may be combined with the complexing solvent in proportions of from 1% to 25% by weight of the total MgCl$_2$ used.

A catalyst component of a catalyst of the Ziegler-Natta type may be obtained essentially by combining the MgCl$_2$ according to the invention with a transition metal compound. Thus, a component of this type may be obtained by depositing, on the MgCl$_2$, a titanium, vanadium, zirconium and/or hafnium compound, which is preferably halogenated, and more particularly TiCl$_4$, TiCl$_3$, TiCl$_n$(OR)$_{4-n}$, where $0 \leq n \leq 3$ and R is a saturated hydrocarbon radical having from 1 to 12 carbons, VCl$_3$, VCl$_4$ or VOCl$_3$, HfCl$_4$ or ZrCl$_4$. This catalyst component in combination with a cocatalyst selected from among organometallic compounds of metals of Groups I to III of the Periodic Table, and more particularly aluminum compounds, is a useful catalyst for the polymerization or copolymerization of linear or branched olefins, such as ethylene, propylene, 1-butene, 1-hexene, 1-octene, 4-methyl-1-pentene, 1,3-butadiene or 1,9-decadiene.

At least one electron donor may be added to the catalyst component during its production and/or to the cocatalyst. This electron donor may be, for example, selected from among Lewis bases, esters and polyesters of oxygen-containing acids, ethers and polyethers, amines, silicon compounds such as silanes and alkylalkoxysilanes of formulae SiR$_1$R$_2$(OR)$_2$, SiR$_1$(OR)$_3$ or SiR$_1$R$_2$R$_3$(OR), the various Rs being hydrocarbon radicals having from 1 to 12 carbons, and also phosphorus compounds such as phosphates and phosphonates, the preferred electron donors being aromatic acid alkyl esters or polyesters, alkyl monoethers or diethers, alkoxysilanes, alkylalkoxysilanes and Lewis acids. In addition to, or instead of, the electron donor, the support may be treated with a Lewis acid selected from among organoaluminum compounds such as those described above as cocatalysts.

The catalyst obtained from a component produced from the MgCl$_2$ of the invention is suitable for all types of polymerization of olefins, whether at high or low pressure, in suspension, in the gas phase or in bulk.

The active catalyst may advantageously be prepared by impregnating the MgCl$_2$ particles described above in known manner with a liquid or dissolved transition metal compound containing one or more halogen atoms and particularly chlorine. Prior to this impregnation, or at the same time, it may be advantageous to deposit at least one of the electron donors indicated above.

The resulting catalyst, in combination with a conventional cocatalyst, typically an organoaluminum compound such as aluminoxanes, aluminosiloxanes, compounds containing Al—R—Al bonds, in which R is an alkyl group, or of formula AlXqR's, in which X is Cl or OR', wherein R' is a C$_1$ to C$_{15}$ hydrocarbon and preferably a C$_1$ to C$_{12}$ alkyl radical, and q and s are numbers such that $1 \leq s \leq 3$, $0 \leq q \leq 2$ where q+s=3, constitutes a catalyst suitable for the polymerization of olefins and more particularly of ethylene, propylene, 1-butene, 4-methyl-1-pentene and 1-hexane, octene, 1,3-butadiene or mixtures thereof. The combination of at least one electron donor as described above with the cocatalyst is also within the scope of the invention. The catalyst component and the cocatalyst are advantageously combined in proportions such that the molar ratio of aluminum contained in the cocatalyst to the transition metal in said component ranges from 0.5 to 2,000 and preferably from 1 to 1,000.

The polymerization of the aforementioned olefins and in general of C$_2$ to C$_{12}$ olefins, either alone or in admixture, utilizing the catalyst system described above may be carried out in solution or in suspension in an inert liquid medium and, in particular, in an aliphatic hydrocarbon such as n-heptane, n-hexane, isohexane or isobutane, or in bulk in at least one of the olefins to be polymerized maintained in the liquid or hypercritical state.

The operating conditions, in particular temperatures, pressures and quantity of catalyst system, for these polymerizations in liquid phase are those which are typically employed in similar polymerizations utilizing supported or unsupported conventional catalyst systems of the Ziegler-Natta type.

For example, for a polymerization carried out in suspension or in solution in an inert liquid medium, the reaction may be carried out at temperatures ranging up to 250° C. and at pressures ranging from atmospheric pressure to 250 bars. In the case of a polymerization in liquid propylene medium, the temperatures may range up to the critical temperature and the pressures may range from atmospheric pressure to the critical pressure. For a bulk polymerization or copolymerization of ethylene to produce polyethylene or copolymers containing a predominant proportion of ethylene, the reaction may be carried out at temperatures ranging from 130° C. to 350° C. and under pressures ranging from 200 to 3,500 bars.

The catalyst system obtained by combining the transition metal component according to the invention with a cocatalyst and, optionally, an electron donor as described above may also be used for the gas phase polymerization of olefins, or mixtures of olefins indicated above. In particular, a mixture of ethylene or propylene and one or more C$_2$ to C$_{12}$ olefins, such as ethylene, propylene, 1-butene, 1-hexene, 4-methyl-1-pentene and 1-octene, may be polymerized in the gas phase in contact with said catalyst system, the mixture containing, when it is in contact with the catalyst system, a molar proportion of C$_2$ to C$_{12}$ comonomers ranging from 0.1% to 90% and preferably from 1% to 60%.

The gas phase polymerization of the olefin or olefins in contact with the catalyst system may be carried out in any reactor permitting gas phase polymerization and, in particular, in a stirred-bed and/or fluidized-bed reactor. The operating conditions for the gas phase polymerization, in particular temperature, pressure, injection of the olefin or olefins into the stirred bed and/or fluidized bed reactor, and control of the polymerization temperature and pressure, are analogous to those known to this art for the gas phase polymerization of olefins. In general, the polymerization is carried out at a temperature below the melting point m.p. of the polymer or copolymer to be synthesized, and, more particularly, at from +20° C. to (m.p. −5)° C., and at a pressure such that the olefin or the olefins and, where appropriate, the other hydrocarbon monomers present in the reactor are essentially in the vapor phase.

Solution, suspension, bulk or gas phase polymerization may be carried out in the presence of a chain transfer agent, such as to control the melt flow index of the polymer or copolymer to be produced. The preferred chain transfer agent is hydrogen, which is used in an amount which may range up to 90% and preferably ranges from 0.1% to 60% of the volume of all of the olefins and hydrogen charged to the reactor.

The transition metal component according to the invention may also be used for the preparation of an active prepolymer, which can be used alone or in combination with a cocatalyst selected from among the aluminum compounds indicated above.

Said active prepolymer is prepared by contacting one or more $C_2$ to $C_{12}$ alpha-olefins, optionally in the presence of hydrogen, with a catalyst system formed by combining the transition metal component according to the invention with a cocatalyst selected from among the compounds indicated above for this purpose and used in the proportions noted above, the $C_2$ to $C_{12}$ olefin or the $C_2$ to $C_{12}$ olefins being employed in an amount representing from 2 to 500 grams and preferably from 2 to 100 grams of $C_2$ to $C_{12}$ olefin or $C_2$ to $C_{12}$ olefins per gram of the transition metal component.

The catalyst component according to the invention is particularly advantageous for the polymerization or copolymerization of ethylene or of propylene, or of mixtures thereof with one another or with another olefin, in that it permits polymers or copolymers to be prepared which have a narrow particle size distribution without fine particles, a good flowability and a melt flow index suitable for the usual applications.

The polyolefins or olefin copolymers obtained comprise particles which have an average size generally ranges from 500 to 7,000 μm and more particularly from 1,000 to 5,000 μm. The particle size distribution range $D_{90}/D_{10}$ of the powders is usually less than 15 and is generally less than 10, the apparent density (ad) of said powders, determined in accordance with ASTM standard D1895 method A, generally ranges from 0.2 to 0.5 g/cm³ and preferably from 0.25 to 0.5 g/cm³. The flowability of the powders is high, with values usually less than or equal to 20 seconds in accordance with ASTM standard D1895. Their specific surface area generally ranges from 0.1 to 20 m²/g. Their porosity characteristically ranges from 0.1 to 1 cm³/g.

In the case of the polymerization of propylene, the polypropylene particles generally have a form substantially homothetic with that of the particles of the catalyst component. Thus, at least 90% by weight of the polypropylene particles generally have the appearance of twinned crystals. As indicated above, this form presents the advantage with respect to sphericity of reducing the accumulation of electrostatic charges in the reactors and piping. Under industrial polymerization conditions, at least 99% by weight of the polypropylene particles have a size greater than 500 μm.

Figure 5:
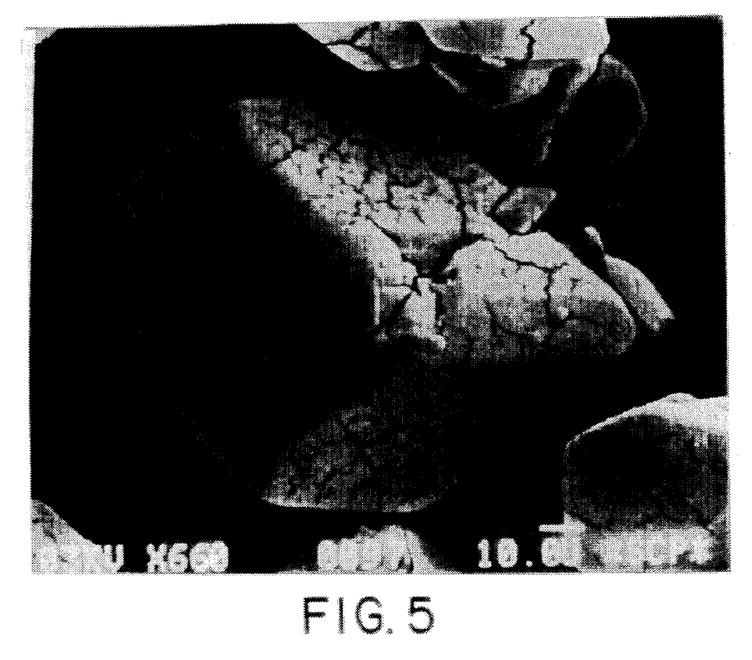
FIG. 5 is a photomicrograph showing an $MgCl_2$ particle according to the present invention in the form of a twelve-faced polyhedron, at a magnification of 660.

Again referring specifically to the attached Figures of Drawings, FIG. 5 is a photomicrograph showing an $MgCl_2$ particle according to the invention in the form of a twelve-faced polyhedron, at a magnification of 660.

Figure 6:
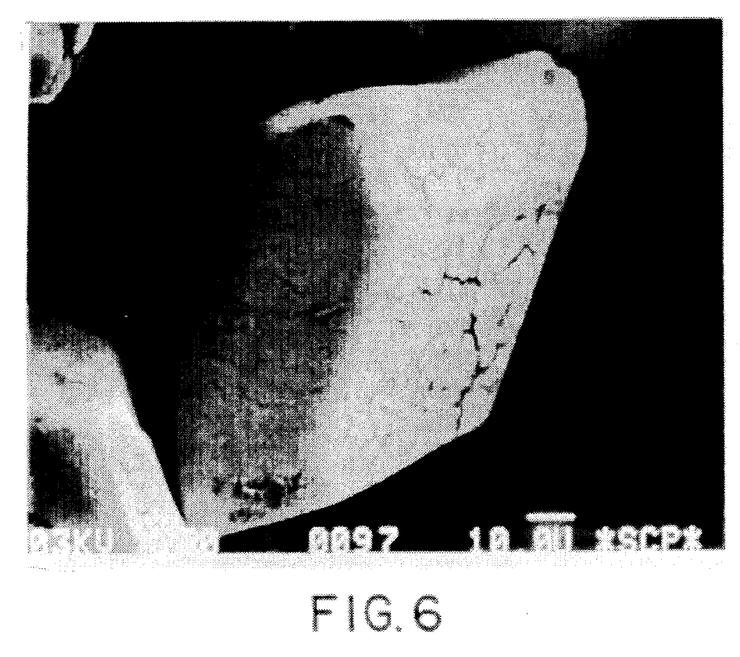
FIG. 6 is a photomicrograph showing an $MgCl_2$ particle according to the present invention in the form of a ten-faced polyhedron, at a magnification of 720.

FIG. 6 is a photomicrograph showing an $MgCl_2$ particle according to the invention in the form of a ten-faced polyhedron, at a magnification of 720.

Figure 7:
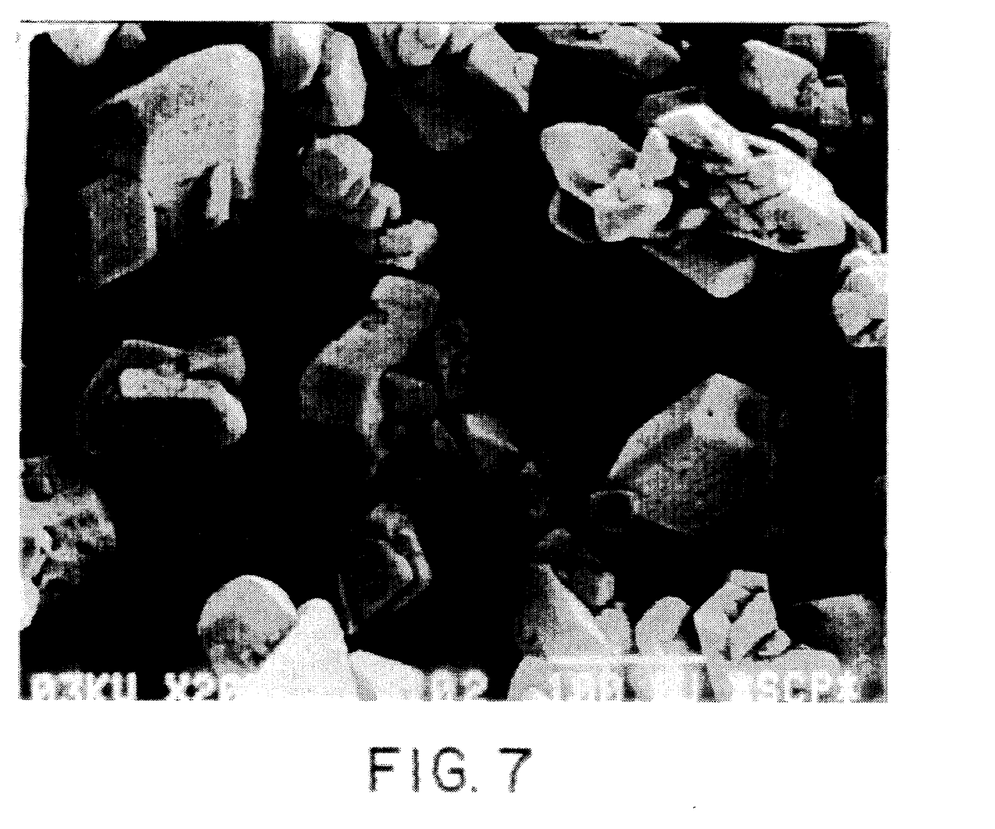
FIG. 7 is a photomicrograph showing a plurality of $MgCl_2$ particles at a magnification of 200.

FIG. 7 is a like photomicrograph showing a plurality of $MgCl_2$ particles at a magnification of 200.

Figure 8:
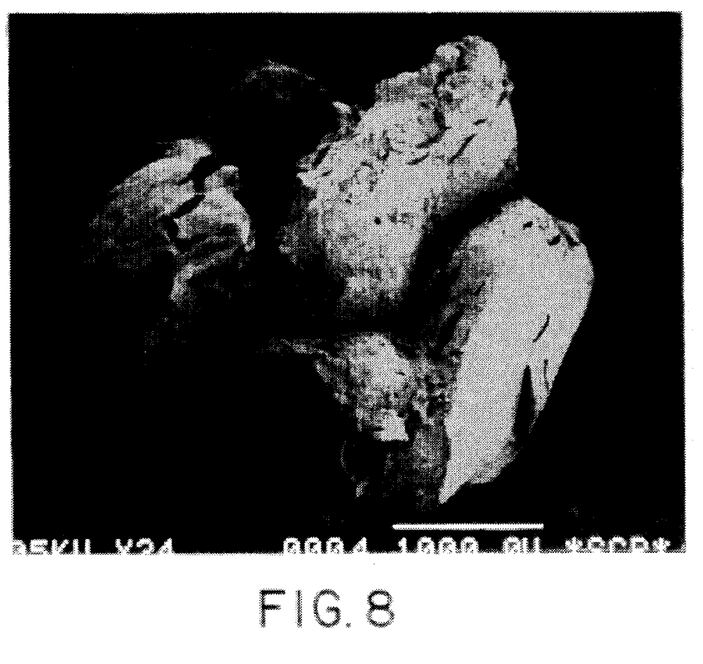
FIG. 8 is a photomicrograph of a polypropylene particle according to the invention in the form of twinned crystals, at a magnification of 24.

FIG. 8 is a photomicrograph of a polypropylene particle according to the invention in the form of twinned crystals, at a magnification of 24.

Figure 9:
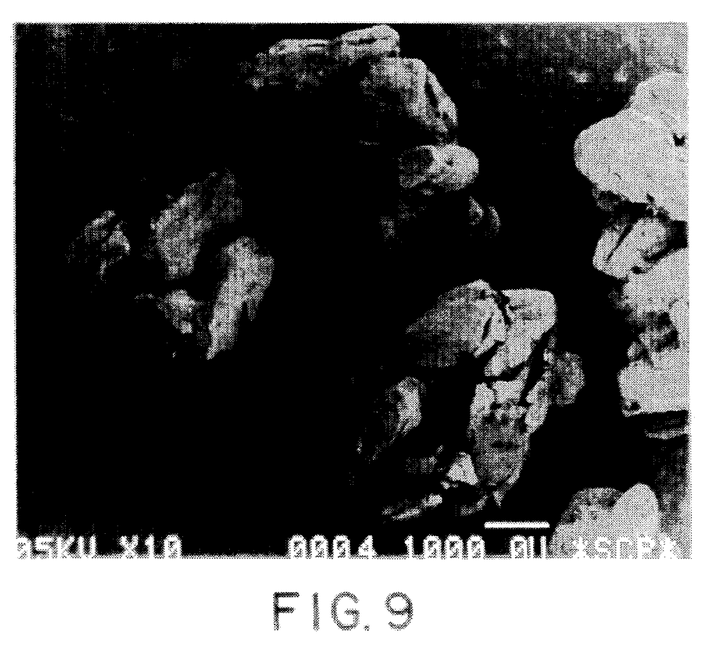
FIG. 9 is a photomicrograph showing a plurality of such polypropylene particles at a magnification of 10.

FIG. 9 is a like photomicrograph showing a plurality of such polypropylene particules at a magnification of 10.

The average diameter of the particles and the particle size distribution width of the $D_{90}/D_{10}$ are determined using a Malvern 1600 laser particle sizer. The specific surface area is determined by isothermal physical adsorption of nitrogen at the temperature of liquid nitrogen, using the BET method, in a Quantasorb apparatus. The pore volume is determined by mercury intrusion under pressure using an Erbascience 1500 porosimeter. The determinations are carried out after treatment of the samples under vacuum for 2 hours at ambient temperature.

In order to further illustrate the present invention and the advantages thereof, the following specific examples are given, it being understood that same are intended only as illustrative and in nowise limitative.

EXAMPLE 1

The following materials were introduced, respectively, under a nitrogen atmosphere and under mild stirring, into a first 2-1 reactor provided with a double wall for temperature control and a stirrer system: 84 g of commercial anhydrous $MgCl_2$ containing less than 0.3% of water, and 1.6 liters of tetrahydrofuran (THF). The temperature was adjusted to 60° C. and the stirring rate was increased to 100 rpm. The reactor was maintained under 2 bars of nitrogen. After a reaction time of 16 hours, a suspension of particles was obtained.

After decompression, the suspension obtained in the above reactor was heated to boiling and the THF vapor produced was recondensed in a second two-liter double-walled reactor, which was stirred at 130 rev/min, had a filtering base, was purged with nitrogen, contained 150 g of commercial anhydrous $MgCl_2$ and was maintained at 60° C. (see FIG. 1). The solution formed in this second reactor was recovered beneath the filtering base and recycled into the suspension in the first receptor.

The process was operated in a closed loop until the $MgCl_2$ present in the second reactor was exhausted.

At the end of 7 hours, the temperature was decreased to 60° C., the suspension was filtered and the cake was then washed four times with 1.6 liters of hexane. After the final filtration, drying was carried out at 75° C. by entrainment in nitrogen. 300 g of a solid white powder of good flowability and having the following characteristics:

(a) molar composition $MgCl_2$ 1.5 THF, (b) ad=0.65 g/cm³ (apparent density), (c) average particle size 110 microns, (d) $D_{90}/D_{10}$=3.5 were collected under nitrogen.

Examination under a scanning electron microscope evidenced polyhedral particles, predominantly of truncated bipyramids connected to one another by the largest bases and prisms having bevelled sides.

EXAMPLE 2

The apparatus shown in FIG. 1 was employed. The first reactor was charged with 1.6 liters of THF, which was heated to boiling, with stirring. The THF vapor produced was recondensed in the second two-liter reactor, which was stirred at 130 rev/min, contained 234 g of commercial anhydrous $MgCl_2$ and was maintained at 60° C. The solution formed in the second reactor was recovered beneath the filtering base and recycled into the first reactor. The process was operated in a closed loop until the $MgCl_2$ present in the second reactor was exhausted.

At the end of 7 hours the temperature was decreased to 60° C., the suspension was filtered and the cake was then washed 4 times with 1.6 liters of hexane. After the final filtration, drying was carried out at 75° C. by entrainment in nitrogen. 310 g of a white powder of good flowability having the following characteristics:

(a) molar composition $MgCl_2$ 1.5 THF, (b) ad=0.63 $g/cm^3$, (c) average particle size 100 microns, (d) $D_{90}/D_{10}=3$ were collected under nitrogen.

Examination under the scanning electron microscope evidenced a morphology identical to that of the product of Example 1.

EXAMPLE 3

The procedure of Example 1 was repeated, except that 10.5 g of 1,2,4,5-tetramethylbenzene were introduced with the 84 g of $MgCl_2$. At the end of drying, 305 g of a white powder having the following characteristics:

(c) average particle size of 107 microns, (d) $D_{90}/D_{10}=3.5$ were collected under $N_2$.

The morphology obtained was that of the product of Example 1.

EXAMPLE 4

The procedure of Example 1 was repeated, except that 10.5 g of toluene were introduced after the addition of the 84 g of $MgCl_2$. At the end of drying, 302 g of a white powder having the following characteristics:

(c) average particle size=158 microns, (d) $D_{90}/D_{10}=3.3$ were collected under $N_2$.

The morphology of the particles obtained was that of the product of Example 1.

EXAMPLE 5

The procedure of Example 1 was repeated, except that 10.5 g of polyvinyl chloride having a K value of 67 were introduced after addition of 84 g of $MgCl_2$. At the end of drying, 295 g of a white powder having the following characteristics:

(c) average particle size=125 microns, (d) $D_{90}/D_{10}=3.3$ were collected under $N_2$.

The morphology of the particles obtained was that of the product of Example 1.

EXAMPLE 6

The procedure of Example 1 was repeated, except that 10.5 g of polystyrene (MI=2.5) were introduced after addition of the 84 g of $MgCl_2$. At the end of the drying, 321 g of a white powder having the following characteristics:

(c) average particle size=130 microns, (d) $D_{90}/D_{10}=3.8$ were collected.

The morphology of the particles obtained was that of the product of Example 1.

EXAMPLE 7

The procedure of Example 1 was repeated, except that 10.5 g of polyethylene ($MI_2=70$) were introduced after addition of the 84 g of $MgCl_2$. At the end of drying, 334 g of a white powder having the following characteristics:

(c) average particle size=106 microns, (d) $D_{90}/D_{10}=4.6$ were collected.

The morphology of the particles obtained was that of the product of Example 1.

EXAMPLE 8

The procedure of Example 1 was repeated, except that 10.5 g of polymethylhydrosiloxane were introduced after addition of the 84 g of $MgCl_2$. At the end of drying, 365 g of a white powder having the following characteristics:

(c) average particle size=95 microns, (d) $D_{90}/D_{10}=4$ were collected.

The morphology of the particles obtained was that of the product of Example 1.

EXAMPLE 9

The following materials were introduced, with stirring and under a nitrogen atmosphere, into the 0.5-1 reactor A of the apparatus of FIG. 2, which was maintained at 60° C.: 6 g of commercial $MgCl_2$ and 0.12 1 of THF. Stirring was continued at 60 rev/min for 16 hours. A suspension of particles was obtained. The boat G was then charged with 12 g of commercial $MgCl_2$, again under a nitrogen atmosphere. The THF in reactor A was heated to boiling. The THF vapor produced condensed in the condenser and dropped back into the boat containing $MgCl_2$. A solution y was formed, which dropped back into the reactor.

The process was operated until the $MgCl_2$ in the boat was exhausted. At the end of 10 hours, the temperature was decreased, the suspension was filtered and the cake was then washed four times with 0.12 liter of hexane. After the final filtration, drying was carried out at 75° C. by entrainment in nitrogen. 25 g of a white powder of good flowability having the following characteristics:

(a) molar composition $MgCl_2$ 1.5 THF, (b) ad=0.63 $g/cm^3$ (c) average particle size=125 microns, (d) $D_{90}/D_{10}=4$ were collected under nitrogen.

Examination under the scanning electron microscope evidenced the same morphology as that of the product of Example 1.

EXAMPLE 10

The following materials were introduced, at 20° C., into a 0.3-liter reactor which was purged with nitrogen and provided with a double wall, a filtering base and a stirrer rotating at 180 rev/min: 14.9 g of $MgCl_2$ treated as in Example 1, 145 cc of pure $TiCl_4$, 2.3 cc of dibutyl phthalate and 48 cc of toluene. The mixture was stirred at 90° C. for two hours and then filtered. Five one-hour washings were carried out using 195 cc of a 5/95 by volume mixture of TiCl$_4$/toluene at 100° C. and then three 15-min washings were carried out using 150 cc of hexane at 60° C. After the final filtration, drying was carried out by entrainment under N$_2$ at 60° C. A catalyst component of good flowability containing: Ti=3.2%, Mg=18.9% and Cl=62.3% was collected. The average size of the particles was 62 microns.

EXAMPLE 11

1 liter of hexane, 6 mM of triisobutylaluminum and 20 mg of catalyst component obtained according to Example 10 were introduced, at 40° C., under a stream of nitrogen, into a 1.5-1 stainless steel reactor equipped with an anchor stirrer with magnetic drive rotating at 400 rev/min and heat control by means of a double wall.

The nitrogen pressure was increased to 2 bars absolute and the temperature was adjusted to 80° C. At temperature equilibrium, the pressure was adjusted to 3 bars absolute by supplying nitrogen. 4 bars of hydrogen and 6 bars of ethylene were added. The pressure was maintained constant at 13 bars absolute by supplying ethylene. At the end of a reaction time of 120 minutes, the temperature was decreased to 30° C. and the pressure in the reactor was released to atmospheric pressure. 388 g of polymer were recovered after filtering and drying. The efficiency was 19,400 g PE/g of catalyst and the average diameter of the powder was 1,176 microns for a D$_{90}$/D$_{10}$ ratio of 3.3 and an apparent density of 0.3. The melt flow indices at 190° C. under a load of 2.16 kg and 5 kg were 2.07 and 6.18, respectively.

EXAMPLE 12

The procedure of Example 10 was repeated, except that 14.9 g of MgCl$_2$, treated according to Example 3, were introduced. At the end of the treatment, a catalytic component of good flowability containing: Ti=2%, Mg=20%, was collected. The average size of the particles was 73 μm.

EXAMPLE 13

The procedure of Example 10 was repeated, except that 14.9 g of MgCl$_2$, treated according to Example 2, were introduced. At the end of the treatment, a catalytic component of good flowability containing: Ti=2.2%, Mg=17.2%, was collected. The average size of the particles was 80 μm.

EXAMPLE 14

The procedure of Example 10 was repeated, except that 14.9 g of MgCl$_2$, treated according to Example 6, were introduced. At the end of the treatment, a catalytic component of good flowability containing: Ti=2%, Mg=17%, was collected. The average size of the particles was 74 μm.

EXAMPLE 15

The following materials were introduced at 30° C., in this order, into a 3.5-liter stainless steel reactor provided with a magnetic stirrer and heat control by means of a double wall: 1.2 liters of hydrogen, 2.4 liters of liquid propylene, 24 mM of triethylaluminum and 2.4 mM of cyclohexylmethyldimethoxysilane.

After a precontact time of 10 minutes, 20 mg of the catalytic component described in Example 12 were injected into the reactor. The temperature was rapidly increased to 70° C. and maintained for one hour at this value.

At the end of the reaction, the reactor was cooled and the pressure decreased to atmospheric pressure. 960 grams of a powder with an apparent density of 0.32 (ASTM standard D 1895 method A) and an isotacticity index, measured by extracting the amorphous polymer with heptane using a Kumagawa apparatus, of 97.9% by weight were recovered. The melt index measured according to ASTM standard D 1238 method 2 was 3.8.

The polymer exhibited the following characteristics: average diameter (D$_{50}$) of 2,240 μm, a particle size distribution width (D$_{90}$/D$_{10}$) of 1.4 and a fines percentage (<500 μm) of 0%.

EXAMPLE 16

The procedure of Example 15 was repeated, except that 20 mg of the catalytic component described in Example 13 were introduced. At the end of the reaction, 930 grams of a powder with an apparent density of 0.32 and an isotacticity index of 98.4% by weight were recovered. The melt index was 3.3.

The polymer exhibited the following characteristics: average diameter of 2,230 μm, a particle size distribution width of 1.4 and a fines percentage (<500 μm) of 0%.

EXAMPLE 17

The procedure of Example 15 was repeated, except that 20 mg of the catalytic component described in Example 14 were introduced. At the end of the reaction, 956 grams of a powder with an apparent density of 0.32 and an isotacticity index of 99.3% by weight were recovered. The melt index was 3.9.

The polymer exhibited the following characteristics: average diameter of 2180 μm, a particle size distribution width of 1.8 and a fines percentage (<500 μm) of 0%.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. Crystalline MgCl$_2$ particulates comprising substantially regular polyhedra having an even number of from 10 to 18 face surfaces, each pair of symmetrically opposite face surfaces of which being substantially parallel.

2. The MgCl$_2$ particulates as defined by claim 1, having a structure ranging from two truncated pyramids joined at their largest bases to a prism having bevelled sides.

3. The MgCl$_2$ particulates as defined by claim 1, wherein the greatest distance (D) opposing the two points furthest apart from one another in the particle ranges from 10 to 400 μm.

4. The MgCl$_2$ particulates as defined by claim 3, wherein the greatest height (h) separating the two parallel faces of a particle which are furthest apart from one another ranges from 0.6 to 0.8 (D) and the smallest height (e) separating the two parallel faces of the same particle which are closest to one another ranges from 0.1 to 0.8 (D), with the proviso that the ratio (h)/(e) ranges from 1 to 8.

5. The MgCl$_2$ particulates as defined by claim 1, have the shape of twinned crystals.

6. The MgCl$_2$ particulates as defined by claim 1, having a porosity ranging from 0.1 to 1 cm$^3$/g.

7. The MgCl$_2$ particulates as defined by claim 1, having a specific surface area ranging from 0.5 to 15 m$^2$/g.

8. The MgCl$_2$ particulates as defined by claim 1, having an average particle size ranging from 50 to 200 μm for a particle size distribution range $D_{90}/D_{10}$ of less than 10.

9. The $MgCl_2$ particulates as defined by claim 1, further comprising .nX in the form of a complex $MgCl_2.nX$, in which X is a complexing solvent therefor and n is a number such that the amount by weight of said complexing solvent maintains the crystallography thereof.

10. The $MgCl_2$ particulates as defined by claim 9, wherein n ranges from 0 to 3.

11. The $MgCl_2$ particulates as defined by claim 1, in essentially anhydrous state.

12. A process for the preparation of the $MgCl_2$ particulates as defined by claim 1, comprising suspending $MgCl_2$ particles in at least one complexing solvent therefor, distilling said at least one complexing solvent, enriching the distillate in $MgCl_2$ by dissolving solid $MgCl_2$ therein, recycling said enriched distillate to the medium of suspension, and recovering said $MgCl_2$ particulates therefrom.

13. A process for the preparation of the $MgCl_2$ particulates as defined by claim 1, comprising distilling a medium of suspension which comprises at least one complexing solvent, enriching the distillate in $MgCl_2$ by dissolving solid $MgCl_2$ therein, progressively recycling said enriched distillate to the medium of suspension, and recovering said $MgCl_2$ particulates therefrom.

14. The process as defined by claim 12, said medium of suspension comprising seed crystals of said $MgCl_2$ particulates.

* * * * *